(No Model.)
T. EUPHRAT.
ICE DETACHING TROLLEY FOR ELECTRIC RAILWAYS.
No. 540,487. Patented June 4, 1895.
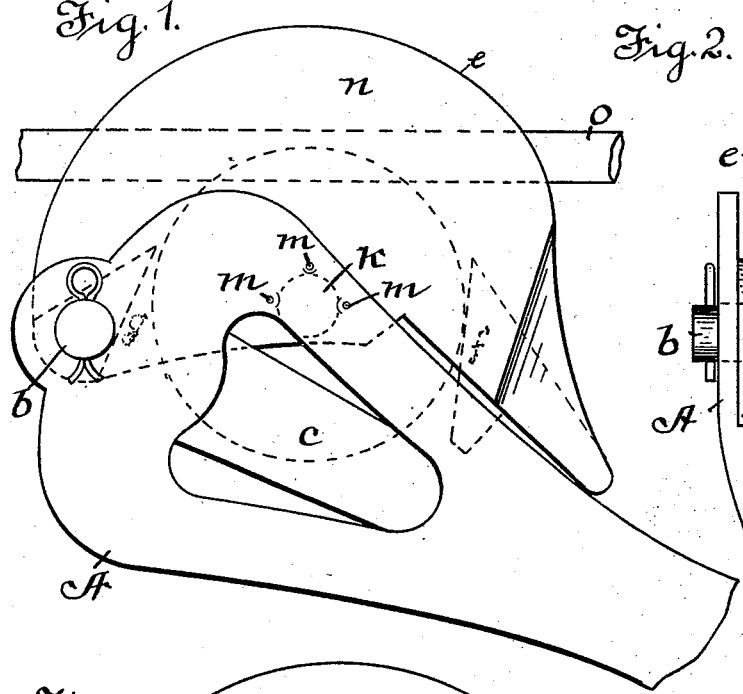
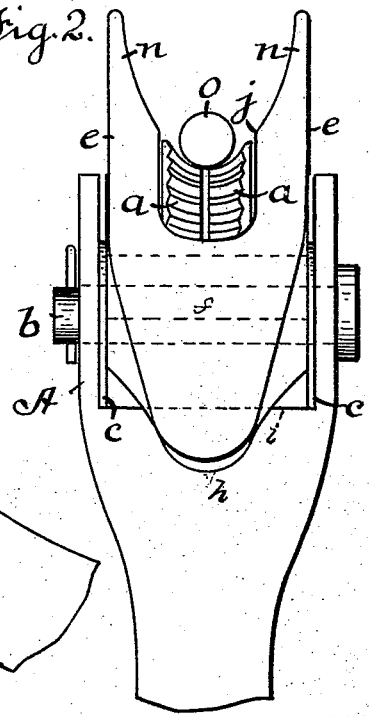
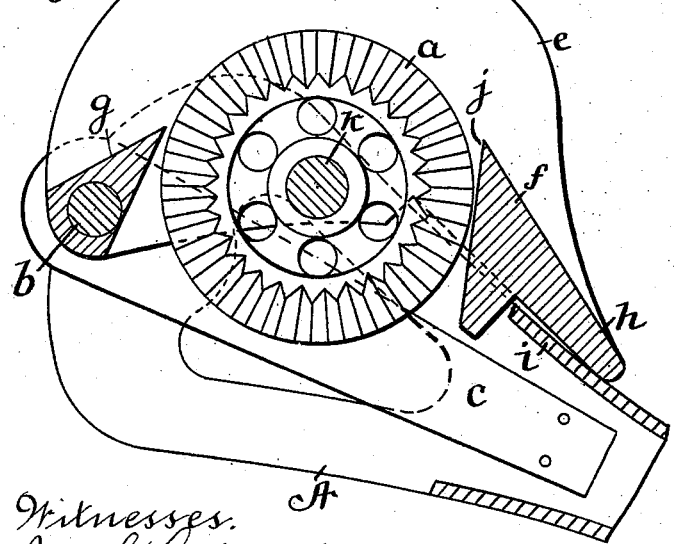
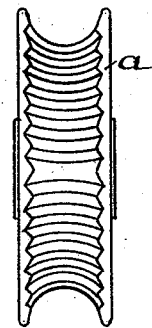
Witnesses.
Jos. S. Lockwood.
W. J. Morgan
Inventor.
Th. Euphrat
By A. P. Thayer
atty.

UNITED STATES PATENT OFFICE.

THEOPHILE EUPHRAT, OF DARIEN, CONNECTICUT.

ICE-DETACHING TROLLEY FOR ELECTRIC RAILWAYS.

SPECIFICATION forming part of Letters Patent No. 540,487, dated June 4, 1895.

Application filed March 22, 1895. Serial No. 542,820. (No model.)

*To all whom it may concern:*

Be it known that I, THEOPHILE EUPHRAT, a citizen of the United States, and a resident of Darien, in the county of Fairfield and State of Connecticut, have invented certain new and useful Improvements in Ice-Detaching Trolleys for Electric Railways, of which the following is a specification.

My invention relates to ice detaching trolley wheels adapted to be substituted for the ordinary wheels and consists of the improvements in such wheels hereinafter described and claimed reference being made to the accompanying drawings, in which—

Figure 1 is a side elevation of the fork of the pole for carrying the ordinary trolley. Fig. 2 is a front elevation of the same. Fig. 3 is a sectional elevation. Fig. 4 is a face view of a solid wheel.

A represents the fork of the trolley carrying pole in which the ordinary trolley wheel is, when used, pivoted at $b$.

$c$ represents the contact for insuring electrical connection of the wheel with the conductor in the pole.

For detaching ice from the conducting wires it is desirable to employ smaller wheels than the ordinary trolley wheels and having transverse serrations of the groove in the face, the depth of the groove being about equal to the radius of the wire, and the radius of the groove being not much more than the radius of the wire, said wheel being preferably made in two parts as $a$, parted at the middle transversely of the axis, as in Figs. 2 and 3, but may be solid as in Fig. 4. The small diameter and the described form of the groove are more favorable for breaking and detaching the ice than larger wheels, and more open or broader grooves as the ordinary trolley wheels are constructed, but my improved wheels may be of ordinary size if desired. When made in two parts and being so that each part is free to turn independently of the other, the ice is less liable to pack and clog in the groove than when made solid.

For substituting such wheels for the ordinary trolley wheels I prefer to mount them in a housing block consisting of cheeks $e$ connected by cross bars $f$—$g$, and having a beak $h$, and mount said housing block in the fork A by the pivot $b$, of the ordinary trolley wheel inserted through the upper end of the fork, and by the beak $h$ resting at the front end on the head $i$ of the fork, instead of mounting them as the ordinary wheels are mounted. The said block has space between the cheeks and the cross webs $f$—$g$ for the wheel and perforations for receiving the pivot pin $k$ on which the wheel is to turn freely but which is to drive snugly in the perforations of the cheeks so as not to be turned by the friction of the wheel on it, and if desired it may be further secured by expanding the metal of the housing block against it with a center punch as indicated at $m$, or by other approved means adapted to hold it against turning by the wheel, but to allow it to be forced out with a drift pin when it may be desirable to change wheels, and the arrangement of the block relatively to the jaws of the fork is such that the pivot $k$ lodges between the jaws when the block is in the normal position and is thus prevented from working out of place lengthwise in case it should work slack in the block.

The cheeks $e$ of the block are shaped on the inside as an extension of the groove of the wheel both upwardly and laterally without any offset or angular projection exposed to contact with the wire for guards $n$ to confine the wheel against being detached from the wire $o$, and the connecting bars $f$—$g$ are formed as tapered chutes tangential to the face of the wheel or nearly so to receive the larger pieces of ice, such as might clog between the wheel and pivot, or head of the fork and discharge them away.

The housing block will be of suitable conductive material for making electrical connection of the wheel and the conductors $c$.

I am aware that a corrugated grooved wheel having angular offsets of the ribs of the corrugations about half the radius of the wire above the bottom of the groove, and designed to act as cutters or breakers for the ice has been used but with damaging effect to the wire, and I do not claim a grooved corrugated wheel broadly.

I claim—

1. A trolley wheel having a groove of about equal depth as the radius of the conducting wire, and formed on a slightly larger radius, in combination with a housing block in which it is mounted having cheeks formed as flaring extensions of the grooves coincident with the transverse outline of the groove, and with the fork of a trolley pole adapted for the ordinary trolley wheels, said housing block being adapted to be lodged and secured in said fork substantially as described.

2. A trolley wheel having a grooved serrated ice breaking face in combination with a housing in which it is mounted having cheeks formed as flaring extensions of the groove coincident with the transverse outline of the groove or substantially so said wheel made in two independently operative parts divided transversely of the axis as described.

3. A trolley wheel having a grooved serrated ice breaking face in combination with a housing block in which it is mounted having cheeks formed as flaring extensions of the groove coincident with the transverse outline of the groove or substantially so, and with the fork of a trolley pole adapted for the ordinary trolley wheel, said housing being adapted to be lodged and secured in said fork substantially as described.

4. A trolley wheel having a grooved serrated ice breaking face in combination with a housing block in which it is mounted having cheeks formed as flaring extensions of the groove coincident with the transverse outline of the groove or substantially so, and with the fork of a trolley pole adapted for the ordinary trolley wheel, said housing being secured in the fork by the trolley wheel pivot and by a rest bearing on the head of the fork substantially as described.

5. A trolley wheel having a grooved serrated ice breaking face in combination with a housing block in which it is mounted having cheeks formed as flaring extensions of the groove coincident with the transverse outline of the groove or substantially so, said housing block also having the cheek connecting bars forming chutes for the larger pieces of detached ice substantially as described.

Signed at New York city, in the county and State of New York, this 5th day of March, A. D. 1895.

THEOPHILE EUPHRAT.

Witnesses:
W. J. MORGAN,
S. H. MORGAN.